United States Patent [19]

Entner

[11] 4,177,867
[45] Dec. 11, 1979

[54] SELF-DRILLING DOWEL WITH AN INCLINED ROLLING HEAD

[75] Inventor: Josef Entner, Frastanz, Austria

[73] Assignee: Hilti Aktiengesellschaft, Schaan, Liechtenstein

[21] Appl. No.: 862,489

[22] Filed: Dec. 20, 1977

[30] Foreign Application Priority Data

Dec. 22, 1976 [DE] Fed. Rep. of Germany ....... 2658290

[51] Int. Cl.$^2$ ............................................. F16B 13/00
[52] U.S. Cl. .................................... 175/400; 175/403; 85/68; 408/205; 125/20; 145/116 R
[58] Field of Search ....................... 175/400, 403, 405; 85/68; 408/204, 205, 206; 125/20; 145/116 R

[56] References Cited

U.S. PATENT DOCUMENTS

| | | | |
|---|---|---|---|
| 443,072 | 12/1890 | Chapman | 175/403 X |
| 2,606,615 | 8/1952 | Pevey et al. | 408/205 |
| 2,827,264 | 3/1958 | Sitton et al. | 175/403 X |
| 3,204,907 | 8/1966 | Mueller et al. | 408/204 |
| 3,467,209 | 9/1969 | Chromy | 85/68 X |
| 3,592,554 | 7/1971 | Takahara | 408/204 |

Primary Examiner—Ernest R. Purser
Assistant Examiner—Nick A. Nichols, Jr.
Attorney, Agent, or Firm—Toren, McGeady and Stanger

[57] ABSTRACT

A self-drilling dowel consists of a tubular-shaped member with a drilling head at one end. The drilling head is formed of a plurality of teeth each having a tip. The tip of the teeth are all disposed in a single plane inclined at an angle to the axis of the tubular-shaped member. A line perpendicular to the plane containing the tips of the teeth and intersecting the axis of the tubular-shaped member is disposed to the axis at an angle in the range of 4° to 9°. The teeth are formed by a cutter with its center located at an offset position from the axis of the tubular-shaped member. The feed line of the cutter extending through its center can be parallel to the axis of the tubular-shaped member or it can be set angularly to the axis of the tubular-shaped member in the range of 4° to 9° or 81° to 86° depending on whether the cutter is moved generally in the axial direction or transversely to the axial direction of the tubular-shaped member.

1 Claim, 3 Drawing Figures

U.S. Patent     Dec. 11, 1979     4,177,867
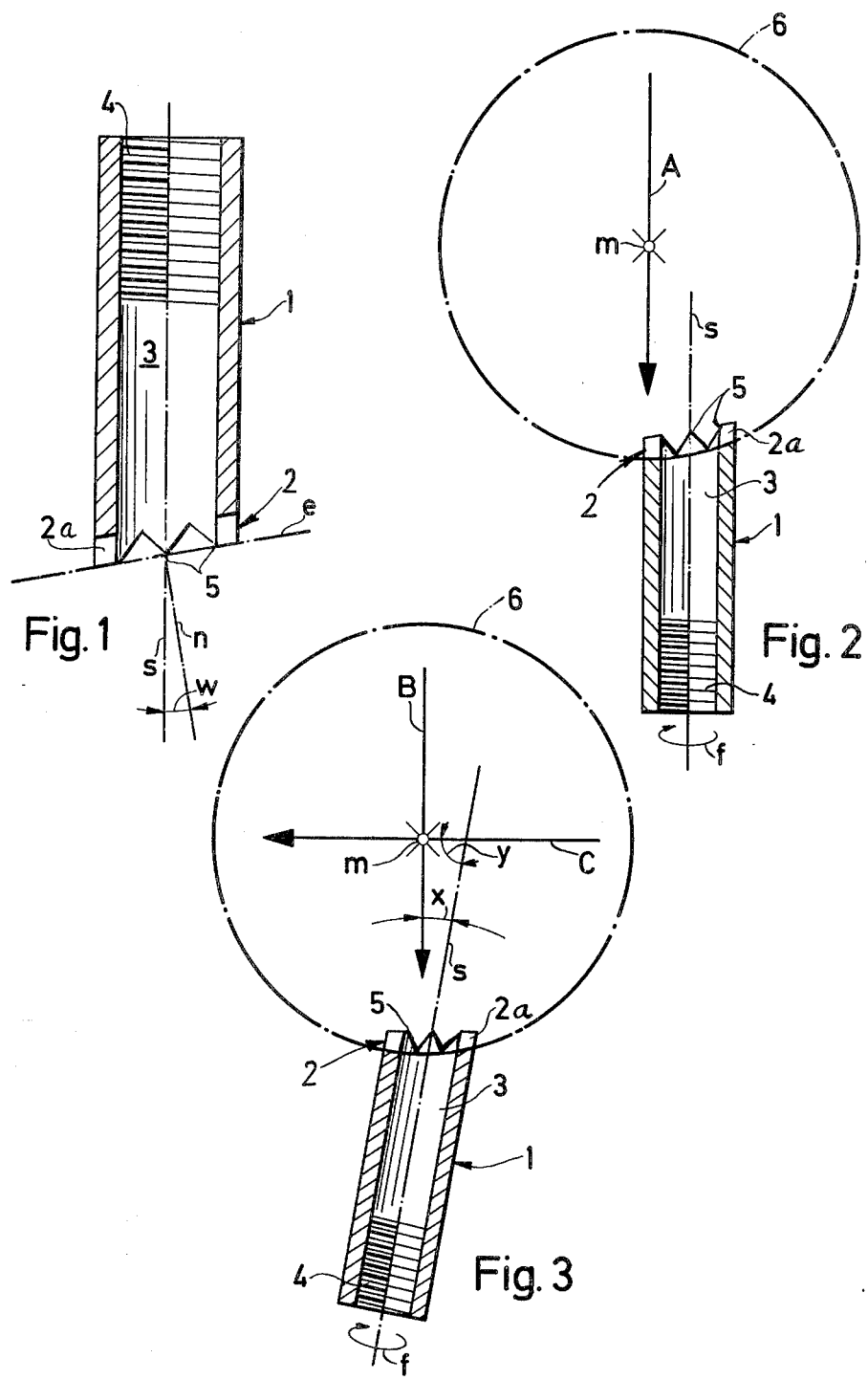

SELF-DRILLING DOWEL WITH AN INCLINED ROLLING HEAD

SUMMARY OF THE INVENTION

The present invention is directed to a self-drilling dowel having a central bore and a drilling head at one end and, more particularly, it concerns the orientation of the drilling head.

Drilling heads are formed on known self-drilling dowels by means of a profile cutter in a two-step operation. The two-step operation consists of cutting steps which are performed successively and in directions which form an angle of 90°. In each of the steps, the cutter is fed toward the front end or the side of the dowel blank. When the cutter is fed toward the front end, it moves in the direction of the longitudinal axis of the dowel and for the depth of the drilling head. When the cutter is fed toward the side of the dowel blank, however, the feed direction is perpendicular to the longitudinal axis of the dowel and, before the cutting step, the cutter is adjusted to the depth of the drilling head.

When these two different feed directions of the cutter are used, drilling heads are produced whose profiles differ insignificantly from one another. The differences are limited mainly to optical aspects. There are no significant differences in the cutting time or in the drilling capacity of the dowel.

In these known production methods, when the cutter is fed toward the front end of the dowel, the longitudinal axis of the dowel extends through the center of the cutter during the entire cutting operation. When the cutter is fed toward the side of the dowel, lines parallel of the longitudinal axis of the dowel extend through the center of the cutter. Accordingly, after the cutting operations, in directions which form an angle of 90° to one another, are concluded, a drilling head is produced which has a symmetrical profile. When self-drilling dowels as described above are used in forming a borehole in a receiving material, such as concrete, rock and the like, the leading tips of the teeth forming the drilling head act simultaneously on the receiving material, since the tips are all located in a plane extending perpendicularly to the axis of the dowel. In such a drilling operation, the cutting forces are uniformly distributed around the circumference of the drilling head and, as a result, the dowel will rotate concentrically. Due to this concentric rotation, a borehole is drilled in the receiving material having a diameter corresponding exactly to the outside diameter of the drilling head. For all practical purposes, there is no play or tolerance between the wall of the borehole and the outer surface of the drilling head.

Since there is no play between the wall of the borehole and the outer surface of the drilling head, the drilled material generated in the formation of the hole cannot escape along the outer surface of the dowel. Therefore, all of the drilled material must be removed through the central bore in the dowel. Such removal tends to result in substantial losses in drilling capacity. Further, the exact formation of the borehole in the receiving material causes a high friction between the outer surface of the dowel and the wall surface of the borehole. This friction also causes losses in drilling capacity. Moreover, the friction may become so great that, after the borehole has been drilled, the dowel can be removed only by employing great force and with special tools. It is essential that the dowel be removed from the borehole both for cleaning and for inserting the spreader. In removing such known dowels, the boreholes may become enlarged or damaged to the extent that the borehole cannot be used.

It is a primary object of the present invention to provide a self-drilling dowel which assures simple and economical placement. The present invention also includes a method of forming such a self-drilling dowel.

In accordance with the present invention, the tips of the teeth forming the drilling head are located essentially in a single plane with the plane being inclined to the axis of the dowel so that a line normal to the plane and passing through the axis forms an angle with the axis of approximately 4° to 9°.

Dowels embodying the present invention have an asymmetrical profile. As mentioned, the tips of the teeth forming the drilling head are located in an inclined plane relative to the longitudinal axis of the dowel. Accordingly, when such a dowel is used in drilling a borehole in a material such as concrete, rock or the like, unequally distributed cutting forces are generated at the outer circumference of the drilling head. In particular, the forces at the forward-most portion of the drilling head, as viewed in the axial direction, are larger than the forces in the remaining portion. As a result, the dowel rotates eccentrically rather than concentrically during the drilling operation. Due to the eccentric character of the drilling operation, the borehole is formed with a diameter slightly larger than the outer diameter of the drilling head on the dowel. Accordingly, a certain amount of play exists between the wall of the borehole and the outer surface of the dowel for facilitating removal of the drilled material. Furthermore, because of such play, there is little friction that will develop during the drilling operation between the wall of the borehole and the outer surface of the dowel. Thus, practically no losses in drilling capacity occur and, moreover, it will be easy to remove the dowel once the borehole has been completed.

The angular extent of the plane containing the tips of the teeth of the drilling head assures that the borehole, as compared to the outer diameter of the dowel, will only be sufficiently wider, on one hand, for effecting a reduction in drilling capacity losses experienced in the prior art, and, on the other hand, for sufficiently anchoring the dowel in the borehole after it has been radially expanded. In view of the anchoring of the dowel in the borehole, it is important to limit the amount of play between the surface of the borehole and the outer surface of the dowel.

In accordance with the present invention, a self-drilling dowel is produced in the following manner. In a first cutting step, the longitudinal axis of the dowel and the feed direction of the cutter extending from its center are located in a single plane and:

(a) the direction of feed of the cutter intersects the axis of the dowel at an angle deviating from 90°, or
(b) the direction of feed and the axis of the dowel are spaced laterally and in parallel relation.

After the first cutting step, the dowel is rotated about its axis through 90° and a second cutting step is performed repeating the first cutting step as set forth above.

In each of the cutting operations embodying the present invention, drilling heads with a plurality of teeth are formed in one end of a dowel with the tips of the teeth all located in a single plane inclined at an oblique angle to the axis of the dowel. The different directional arrangements of the cutter relative to the dowel merely involve different feeding operations. In each operation the two cutting steps are formed in directions arranged at an angle of 90° to one another, as has been known from the past. While the different feeding directions of the cutter may result in certain differences in appearance in the drilling heads, these differences are mainly optical and do not cause any variations in the effectivenss of the dowels as such.

When the cutter is fed toward the front end of the dowel, the axis of the dowel and the feed direction of the cutter my form an oblique angle, that is, an angle other than 90°. It is also possible, however, for the axis of the dowel and the feed direction of the cutter to be disposed in spaced parallel relation. In this arrangement the center of the cutter remains in the same offset relation to the axis of the dowel during the feeding operation. If the cutter is fed toward the side of the dowel, the axis of the dowel and a line perpendicular to the feed direction of the cutter are disposed at an oblique angle to one another. When the cutter is fed toward the front end of the dowel so that the feed direction is at an oblique angle to the longitudinal axis of the dowel, the angle of intersection between the two is preferably in the range of 4° to 9°. If, on the other hand, the cutter is moved toward the side of the dowel, the angular difference between the feed direction and the axis of the dowel is in the range of 81° to 86°.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the Drawing

FIG. 1 is a sectional view of a self-drilling dowel embodying the present invention;

FIG. 2 is a schematic representation of one cutting operation for forming the driling head of the dowel shown in FIG. 1, with the cutter being moved toward the front end of the dowel; and FIG. 3 is a schematic representation of another cutting operation indicating two different feeding directions of the cutter, one toward the front end and the other toward the side of the dowel.

DETAILED DESCRIPTION OF THE INVENTION

In the drawing, a self-drilling dowel 1 is formed from a tubular-shaped member having a drilling head 2 at one end formed by a plurality of teeth 2a with a centrally extending bore 3 through the member and a thread 4 formed in the interior of the bore for a portion of its length at the opposite end from the drilling head. As can be seen at the lower end of the dowel 1, as viewed in FIG. 1, each of the teeth 2a has a tip 5 and each of the tips is located in a single plane e inclined at an oblique angle to the axis s of the dowel. A line n normal to the plane e and intersecting the axis s forms, with the axis, an angle w.

For reasons of simplicity, the schematic representations of the cutting operations afforded in FIGS. 2 and 3 are limited to the arrangement of the self-driven dowel 1 and a cutter 6 schematically represented with a dot-dash line indicating its cutting edge.

In FIG. 2, the cutter 6 is fed toward the front end of the dowel, that is, the end in which the drilling head is formed. The line A displays the feed direction with the arrow head indicating the movement of the cutter toward the front end of the dowel. The feed direction line A is disposed parallel to the axis s of the dowel and is spaced laterally from the axis. Because of the offset arrangement of the center m of the cutter relative to the axis s of the dowel, the tips 5 of the teeth 2a forming the drilling head 2 are all located in a single plane inclined at an oblique angle to the dowel axis.

In FIG. 3 an arrangement is shown in which the feed direction of the cutter can be either toward the front end or the side of the dowel. When the cutter is fed toward the front end of the dowel axis s the feed directional line B is disposed at an angle x to the axis of the dowel. The feed direction line B extends through the center m of the cutter. When the cutter 6 is moved toward the side of the dowel, note feed direction line C which runs to the center m of the cutter, the line C forms an angle y with the axis s of the dowel. In both of these different feeding directions of the cutter 6 shown in FIG. 3, a drilling head 2 is produced with the tips 5 of its teeth 2a all being located in a single plane inclined at an oblique angle to the axis of the dowel.

FIGS. 2 and 3 show, by way of example, the so-called second cutting operation. Following the first cutting operation, as described above, the dowel is rotated through 90° about its axis s in the direction of the arrow f and the second cutting operation is performed in the same manner as the first cutting operation.

While specific embodiments of the invention have been shown and described in detail to illustrate the application of the inventive principles, it will be understood that the invention may be embodied otherwise without departing from such principles.

What is claimed is:

1. A self-drilling dowel for use in drilling a borehole in a hard receiving material such as concrete, rock and the like comprising an axially elongated tubular-shaped member, a drilling head at one end of said member, said drilling head having a plurality of cutting teeth with each of said teeth having a tip, said tubular-shaped member has an inner wall surface and an outer wall surface wherein the improvement comprises that the tips of said teeth extend from the inner wall surface to the outer wall surface of said tubular-shaped member, and the tips of each said teeth are located in a single plane and a line perpendicular to the plane and intersecting the axis of said tubular-shaped member forms an angle in the range of 4° to 9° with the axis.

* * * * *